(12) United States Patent
Purvines et al.

(10) Patent No.: US 7,345,398 B2
(45) Date of Patent: Mar. 18, 2008

(54) ELECTRIC MOTOR STATOR

(75) Inventors: Stephen H. Purvines, Mishawaka, IN (US); Gary F. Glass, Wabash, IN (US); Andrei Chugunov, Ligonier, IN (US)

(73) Assignee: Kurz-Kasch, Inc., Dayton, OH (US)

( * ) Notice: Subject to any disclaimer, the term of this patent is extended or adjusted under 35 U.S.C. 154(b) by 370 days.

(21) Appl. No.: 11/156,430

(22) Filed: Jun. 20, 2005

(65) Prior Publication Data

US 2006/0284513 A1    Dec. 21, 2006

(51) Int. Cl.
*H02K 1/22* (2006.01)
*H02K 3/04* (2006.01)

(52) U.S. Cl. .................. 310/254; 310/208; 310/268

(58) Field of Classification Search ............... 310/179, 310/206, 208, 254, 268
See application file for complete search history.

(56) References Cited

U.S. PATENT DOCUMENTS

| | | | | |
|---|---|---|---|---|
| 3,524,250 A | * | 8/1970 | Burr | 29/597 |
| 4,319,152 A | * | 3/1982 | van Gils | 310/201 |
| 5,334,899 A | * | 8/1994 | Skybyk | 310/268 |
| 5,397,953 A | * | 3/1995 | Cho | 310/254 |
| 5,744,896 A | * | 4/1998 | Kessinger et al. | 310/268 |
| 5,767,600 A | * | 6/1998 | Whiteley | 310/184 |
| RE38,939 E | * | 1/2006 | Kessinger et al. | 310/268 |
| 6,998,751 B2 | * | 2/2006 | Lopatinsky et al. | 310/208 |
| 2007/0040465 A1 | * | 2/2007 | Al-khayat | 310/179 |
| 2007/0210675 A1 | * | 9/2007 | Bender | 310/268 |

FOREIGN PATENT DOCUMENTS

| WO | WO 97/44880 | 11/1997 |
|---|---|---|
| WO | WO 03/049256 | 6/2003 |

* cited by examiner

*Primary Examiner*—Tran Nguyen
(74) *Attorney, Agent, or Firm*—Brooks, Cameron & Huebsch, PLLC

(57) ABSTRACT

Devices and methods are provided for a motor stator. One embodiment for a stator includes a frame for stator windings that includes a hub, spacing members, a rim and posts for receiving and positioning windings of a stator coil. A thermoset material is supplied to the stator to encapsulate the stator.

21 Claims, 8 Drawing Sheets

ELECTRIC MOTOR STATOR

INTRODUCTION

Electrical induction motors include a stator and a rotor to convert electrical energy into a magnetic interaction that causes the rotor to turn. One aspect of creating this magnetic interaction is found in the stator coils. Each stator coil includes windings of conductive wire. When a potential is applied through the stator coils an electromagnetic field can be generated. In addition to the electromagnetic field, heat can also be generated due to the electrical resistance of the conductive wire. The more efficiently this heat can be dissipated, the more efficiently the motor can run.

BRIEF DESCRIPTION OF THE DRAWINGS

The Figs. presented herein provide illustrations of non-limiting example embodiments of the present disclosure. The Figs. are not necessarily to scale.

DETAILED DESCRIPTION

Figure 1:
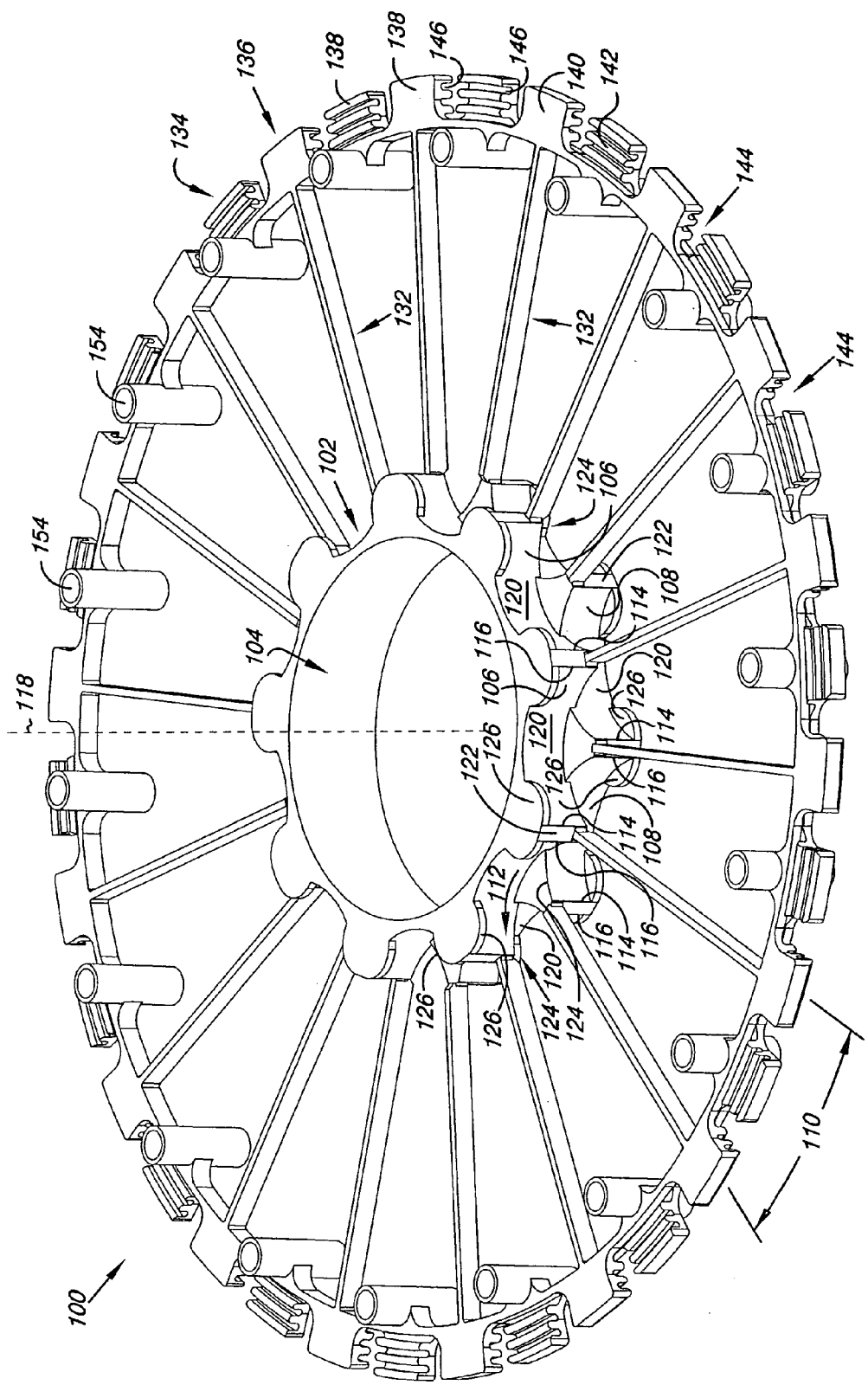
FIG. 1 illustrates one embodiment of a frame for an electric motor stator according to the present disclosure.

Embodiments of the present disclosure include electric motors, components of electric motors (e.g., stators), and methods associated therewith for improved electric motor operation and manufacturing methods. It will be apparent to those skilled in the art that the following description of the various embodiments of this disclosure are provided for illustration only and not for the purpose of limiting the disclosure as defined by the appended claims and their equivalents.

As will be described herein, an electric motor includes, among other things, a housing, a rotor, and a stator disposed adjacent the rotor and fixed within the housing. In the embodiments described in the present disclosure, the stator can be completely encapsulated within a thermoset material. In some embodiments, connector terminals, which form an electrical connection between the stator and a power supply, extend from the completely encapsulated stator. As used herein, a thermoset material includes those polymeric materials that once shaped by heat and pressure so as to form a cross-linked polymeric matrix are incapable of being reprocessed by further application of heat and pressure.

As discussed herein, the stator is formed using a frame for stator windings. The frame includes a hub having a rotor interface, a first winding guide and a second winding guide, the first and second winding guides opposite the rotor interface and radially staggered relative each other by a predetermined angle. Spacing members are coupled to and extend radially from the hub. A rim is coupled to the spacing members and annularly positioned relative the hub. Posts are positioned on the rim, where the posts, the first winding guide and the second winding guide receive stator windings of a conductive wire to form the coils of an electric motor. The stator can then be encapsulated in the thermoset material. As will be discussed herein, the thermoset material can provide both mechanical stabilization and high thermal conductivity properties to the stator.

Embodiments of the present disclosure include the stator in a variety of electric motor configurations. For example, suitable motor configurations can include motors that operate on alternating current (AC) (i.e., induction or synchronous AC motor, switched reluctance motor) and/or direct current (DC) (e.g., a universal motor or a DC motor). As understood, AC motors can be configured as a single-phase, split-phase, or poly-phase such as a three-phase motor. Furthermore, it will be apparent to those skilled in the art from this disclosure that although the present disclosure is used with an electric motor, the present disclosure can be used with other rotary type electric machines such as a generator or motor/generator.

In addition, embodiments of the stator can be used in an axial flux type electric motor. This motor is distinguished from other electric motors due to the different path of the magnetic flux. For example, in most alternating current electrical motors the flux flows radially through the air gap between the rotor and the stator. However in the axial flux type electric motor the flux flows parallel to the axle of the motor. The rotor for the axial flux type motor, often referred to as a pancake rotor, can be made much thinner and lighter, hence these motors are often used for applications requiring quick changes in speed.

In various embodiments of the present disclosure, the stator includes coils mounted in the frame that holds the coils in the appropriate relationship. In one embodiment, the coils can be interlocked through the use of the frame. As will be discussed herein, the frame for the stator windings forming the coils can be formed of a single thermoplastic molded part that provides coil mounting and locking features, wire guides, sensor board mounting, coil insulation, and stator connector terminal integration. In one embodiment, the frame can help to assure proper coil to coil relationship, help in the incorporating of wire guides, features for mounting the motor phase to phase sensor and thermal resistive device mounting board, and coil to coil insulation. In various embodiments, the frame and coils forming the stator are then encapsulated within the thermoset material such that only the connector terminals extend from the thermoset material.

The Figures herein follow a numbering convention in which the first digit or digits correspond to the drawing figure number and the remaining digits identify an element in the drawing. Similar elements between different figures may be identified by the use of similar digits. For example, 102 may reference element "02" in FIG. 1, and a similar element "02" may be referenced as "202" in FIG. 2. As will be appreciated, elements shown in the various embodiments herein can be added, exchanged, and/or eliminated so as to provide a number of additional embodiments.

In describing the various embodiments herein, the following directional terms "annular," "axial," "circumferential," "radial," "longitudinal" and "transverse" as well as other similar directional terms may be used. As used herein, these directional terms as well as other directional terms refer to those directions of the electric motor relative to a center rotational axis of a rotor of the electric motor. Accordingly, these terms, as used to describe the embodiments described herein should be interpreted relative to the center rotational axis of the rotor of the electric motor.

FIG. 1 illustrates one embodiment of a frame 100 for stator windings according to an embodiment of the present disclosure. As illustrated, the frame includes a hub 102. In various embodiments, the hub 102 has a radial interior surface defining a rotor interface 104. In one embodiment, the rotor interface 104 provides a volume to receive at least part of a rotor.

The hub 102 also includes walls defining a first winding guide 106 and a second winding guide 108. As illustrated, the first and second winding guides 106, 108 are opposite the rotor interface 104 on the hub 102. The first and second winding guides 106, 108 are also radially staggered relative each other by a predetermined angle 110. In one embodiment, the predetermined angle 110 can be determined based on the number of winding guides 106, 108 on the hub 102. As will be appreciated, the greater the number of winding guides 106, 108 the smaller the predetermined angle, whereas the smaller the number of winding guides 106, 108 the greater the predetermined angle. For example, as illustrated in FIG. 1 there are nine (9) of the first winding guides 106 and nine (9) of the second winding guides 108. In one embodiment, the winding guides 106, 108 are each of approximately equal dimensions and are equally spaced in their radially staggered positions making the predetermined angle twenty degrees (20°).

The winding guides 106 and 108 generally provide walls having a shape that can receive and help maintain the relative position of windings of the coils provided in the frame 100. For example, as illustrated the first and second winding guides 106, 108 include walls that define a curved surface 112 having a first end 114 and a second end 116. The curved surface 112 can be concave relative a central axis 118 of the hub 102 such that a bottom 120 of the curved surface 112 is closer to the central axis 118 as compared to the first end 114 and second end 116 of the first and second winding guides 106, 108, which are further away from the center axis 118. As will be appreciated, other shapes besides a curve are also possible. These can include walls defining planar surfaces, concave surface, convex surfaces, and channeled surfaces.

In one embodiment, the first and second end 114, 116 of adjacent first winding guides 106 are positioned between the first and second end 114, 116 of the second winding guide 108 to define the predetermined angle 110. As illustrated, a radial surface 122 can be located between the first and second ends 114, 116 of adjacent pairs of the first winding guides 106 and the second winding guides 108.

In various embodiments, the frame 100 also includes a ledge 124. As illustrated, the ledge 124 extends from the surface 112 of the first winding guide 106 to the first and second ends 114, 116 of adjacent second winding guides 108. The ledge 124 also extends from the surface 112 of the second winding guide 108 to the first and second ends 114, 116 of adjacent first winding guides 106. In one embodiment, the ledge 124 can receive and help maintain the relative position of windings of the coils provided in the frame 100.

The hub 102 can also include a positioning tab 126 to receive and help maintain the relative position of windings of the coils provided in the frame 100. As illustrated, the positioning tab 126 provides a shelf like projection from the surface 112 of the first and second winding guides 106, 108.

The frame 100 can further include spacing members 132 coupled to and extending radially from the hub 102. As illustrated, the spacing members 132 extend radially from a position adjacent the first end 114 and the second end 116 of adjacent first winding guides 104 and adjacent second winding guides 106. The spacing members 132 can have a rectangular cross-sectional shape, as illustrated. Other cross-sectional shapes are also possible, including but not limited to triangular, circular, oval, square, and polygonal. In addition, the spacing members 132 can have a uniform or a non-uniform cross-sectional size.

In one embodiment, the spacing members 132 extend between and couple the hub 102 to a rim 134. As illustrated, the rim 134 is annularly positioned relative the hub 102. The rim 134 can include a support ledge 136 to receive and help maintain the relative position of windings of the coils provided in the frame 100. As illustrated, the support ledge 136 includes two or more sections 138 that extend radially away from the center axis 118. The sections 138 can each include a planar surface 140 and a surface defining wire guide channels 142 that encircle the hub 102. As illustrated, the sections 138 alternate presenting the wire guide channel 142 and the planar surface 140 as the support ledge 136 extends radially around the central axis 118.

In one embodiment, the wire guide channel 142 can receive segments of conductive wire that connect the coils of the stator, as will be discussed herein. As illustrated, the sections 138 alternate the presentation of the wire guide channel 142 around the support ledge 136. This configuration can reduce any potential movement of the segments of conductive wire once they are positioned within the wire guide channel 142. In one embodiment, a gap 144 is provided between adjacent sections 138 to allow the segments of conductive wire to be wound into the wire guide channel 142.

In one embodiment, the wire guide channel 142 can include one or more channels 146. As discussed, each channel can receive segments of conductive wire that connect coils of the stator. As will be appreciated, the number of channels 146 can depend on a phase configuration of the motor in which the stator is to be used. For example, in the embodiment illustrated in FIG. 1 there are three channels 146, where each channel can receive segments of conductive wire that operatively couple the coils of a common phase in a three-phase motor. In an alternative embodiment, a single channel 146 can be provided for the guide channel 142 for use in a single phase motor.

The rim 134 further includes posts 150 positioned on the rim 134. As illustrated, the posts 150 are positioned adjacent to and extend perpendicularly away from both the planar surface 138 and the guide channel 142 surface of the support ledge 136. The posts 150 are positioned on an interior surface 152 of the support ledge 136 between two of the spacing members 132, where the adjacent sections 138 extend radially away from the post 150. In one embodiment, the posts 150 and the support ledge 136 can receive and help maintain the relative position of windings of the coils provided in the frame 100.

The post 150 can have a number of different shapes. For example, as illustrated in FIG. 1 the post 150 can be configured as an elongate tube having a bore 154. In one embodiment, the bore 154 is circular. Other shapes for the bore are also possible (e.g., oval, triangular). As will be appreciated, the tube can have a number of cross-sectional shapes, such as those provided herein.

Embodiments of the frame 100 can be formed using a number of techniques and from a number of different materials. For example, the frame 100 can be formed from of, by way of illustration and not by limitation, thermoplastic and thermo-set polymers. Examples of these polymers include polyolefins such as polyethylene and polypropylene, polyesters such as Dacron, polyethylene terephthalate and polybutylene terephthalate, vinyl halide polymers such as polyvinyl chloride (PVC), polyvinylacetate such as ethyl vinyl acetate (EVA), polyurethanes, polymethylmethacrylate, pellethane, polyamides such as nylon 4, nylon 6, nylon 66, nylon 610, nylon 11, nylon 12 and polycaprolactam, polyaramids (e.g., KEVLAR), segmented poly(carbonate-urethane), Rayon, fluoropolymers such as polytetrafluoroethylene (PTFE or TFE) or expanded polytetrafluoroethylene (ePTFE), ethylene-chlorofluoroethylene (ECTFE), fluorinated ethylene propylene (FEP), polychlorotrifluoroethylene (PCTFE), polyvinylfluoride (PVF), or polyvinylidenefluoride (PVDF). Examples of thermoset materials include those discussed herein, besides other known thermosets.

In one embodiment, the frame 100 can be formed through an injection molding process. For example, a single mold can be configured to provide for shape of the frame 100, as discussed herein. The thermoplastic material, or thermoset material, can be injected into the mold to form the frame 100. In alternative embodiment, the frame 100 could be formed in a casting process or stamping. In alternative embodiment, segments of the frame 100 can be individually formed and then coupled together to form the frame 100. For example, one or more of the hub 102, the spacing members 132 and/or the rim 134 can be individually formed. The individual segments can then be coupled together to form the frame 100. Examples of suitable techniques for coupling the individual segments include use of chemical adhesives and/or thermal energy to weld the individual segments together.

Figure 2:
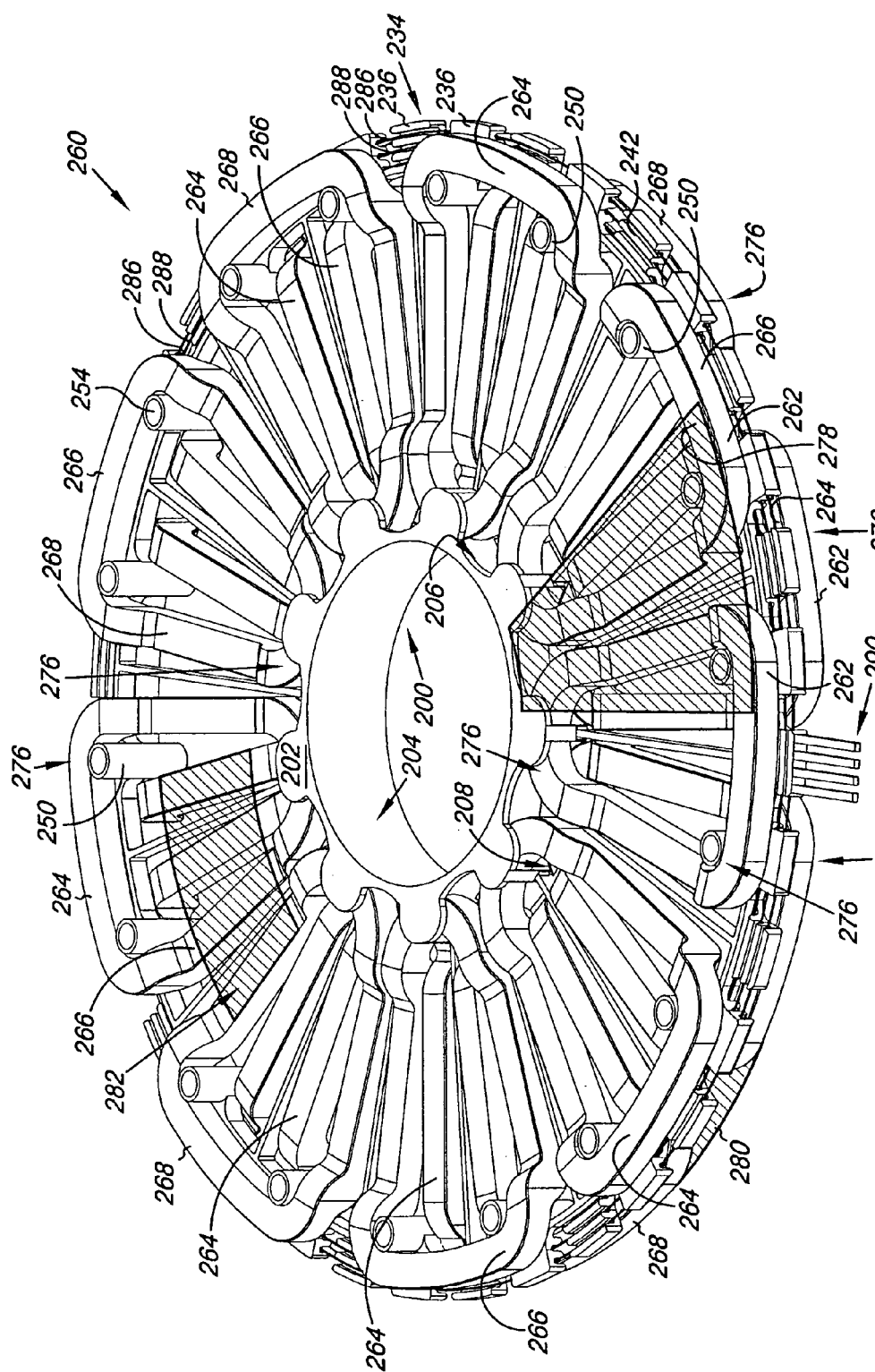
FIG. 2 illustrates one embodiment of an electric motor stator according to the present disclosure.

FIG. 2 illustrates an embodiment of a stator 260 that includes the frame 200 and coils 262 formed from windings of insulated conductive wire. As appreciated, the windings that form coils 262 are from turns of one or more strands of the insulated conductive wire. In one embodiment, the coil 262 can be positioned around at least a portion of adjacent posts 250 and directly adjacent to the ledge 224, tab 226 and one of the first winding guide 206 or the second winding guide 208.

In addition, two or more of the coils 262 can be electrically coupled in series in a single or polyphase configuration. For example, in the present embodiment there is shown a first series 264, a second series 266 and a third series 268 of coils 262 on the frame 200 that form a three-phase configuration for the stator 260. As illustrated, adjacent coils 262 in each series 264, 266, 268 are positioned on opposite sides of the frame 200. For example, a first coil 270 of the first series 264 can be positioned adjacent the first winding guide 206. A second coil 272 of the first series 264 is then spaced apart from the first coil 272, where the second coil 272 is positioned adjacent to the second winding guide 208. A third coil 274 in the first series 264 is likewise spaced apart from the second coil 272, where the third coil 274 is positioned adjacent to the first winding guide 206. This general pattern can then be repeated for the coils 262 in the first, second, and third series 264, 266, 268.

In various embodiments, the coils 262 of the stator 260 are positioned relative each other so as to allow for efficient use of space. For example, the windings of adjacent coils 262 from the second and third series 266, 268 can be positioned at least partially within the volume defined by the windings of the first series 264 of coils 262. This pattern can repeat itself for other combinations of the windings for the first, second, and third series 264, 266, 268. In one embodiment, this allows for a more efficient use of space as the windings of the coils 262 can be more tightly packed into the stator 260.

As illustrated, the windings of the coils 262 can extend along two or more common radial planes. For example, the coils 262 can have a first portion 276 of the windings that share in either a first common radial plane 278 or a second common radial plane 280. The coils 262 also have a second portion 278 that shares a third common radial plane 282 that is different than the first or second common radial plane 278, 280. In one embodiment, the first portion 276 of the coils 262 can be located adjacent the rim 234, the ledge 242, and the first and second winding guides 206, 208. As illustrated, coils 262 that are adjacent the first winding guide 206 share the first common radial plane 278, while the coils 262 that are adjacent the second winding guide 208 share the second common radial plane 278.

The windings of the coils 262 also define a series of corners. For example, the windings that form the coils 262 include a first corner 280 and second corner 282 that bring the windings around the adjacent posts 250. The windings also include a third corner 284 that brings the windings around one of the first winding guide 206 or second winding guide 208. In addition, the windings also include bends 286 that allow the windings to transition between either the first or second common radial plane 278, 280 and the third common radial plane 282. In one embodiment, the bends 286 can be imparted to the coils 262 through the use of a machine press process, as discussed herein.

The coils 262 of the stator 260 further include a start lead segment 286 and a finish lead segment 288 that is at least partially contained within the rim 234. In one embodiment, the start lead segments 286 and the finish lead segments 288 of the coils 262 for each of the first, second, and third series 264, 266, 268 are coupled in series. Each of the start lead segments 286 and the finish lead segments 288 for the series of coils can then be coupled to connector terminals 290 for operating the stator in one of a single phase configuration and a polyphase configuration.

As illustrated, the stator 260 includes eighteen (18) coils 262 arranged annularly on the frame 200. In one embodiment, each of the first, second, and third series 264, 266, 268 includes six (6) coils 262 that are coupled in series and arranged as illustrated to provide for a polyphase operation. As will be appreciated, the stator 260 could be formed with other combinations and numbers of coils 262. Thus, the embodiment illustrated in FIG. 2 is not meant to limit the present disclosure but rather to show one of many stators that can be formed with the coils 262. For example, in some embodiments, the stator 260 can include twelve (12) coils 262 annularly arranged on the frame 200.

The coils 262 can further include insulation positioned between adjacent coils and the surface of the frame 200. For example, the insulation can include a layer of insulating material disposed on the windings of the coil 262. Examples of suitable insulating material can include, but are not limited to, Kapton® tape, NOMEX, MYLAR, TufQUIN, and the like.

As will be appreciated, the coils 262 can be formed from windings of wires having one or more predetermined sizes of American Wire Gauge (AWG), magnetic characteristics, malleability, and number of turns. In addition, the wire can be formed from a number of different electrically conductive metals (e.g., copper) and/or metal alloys as are know. The wires forming the windings can also be electrically insulated relative each other (e.g., each wire has an electrically insulating sheath).

Figure 3:
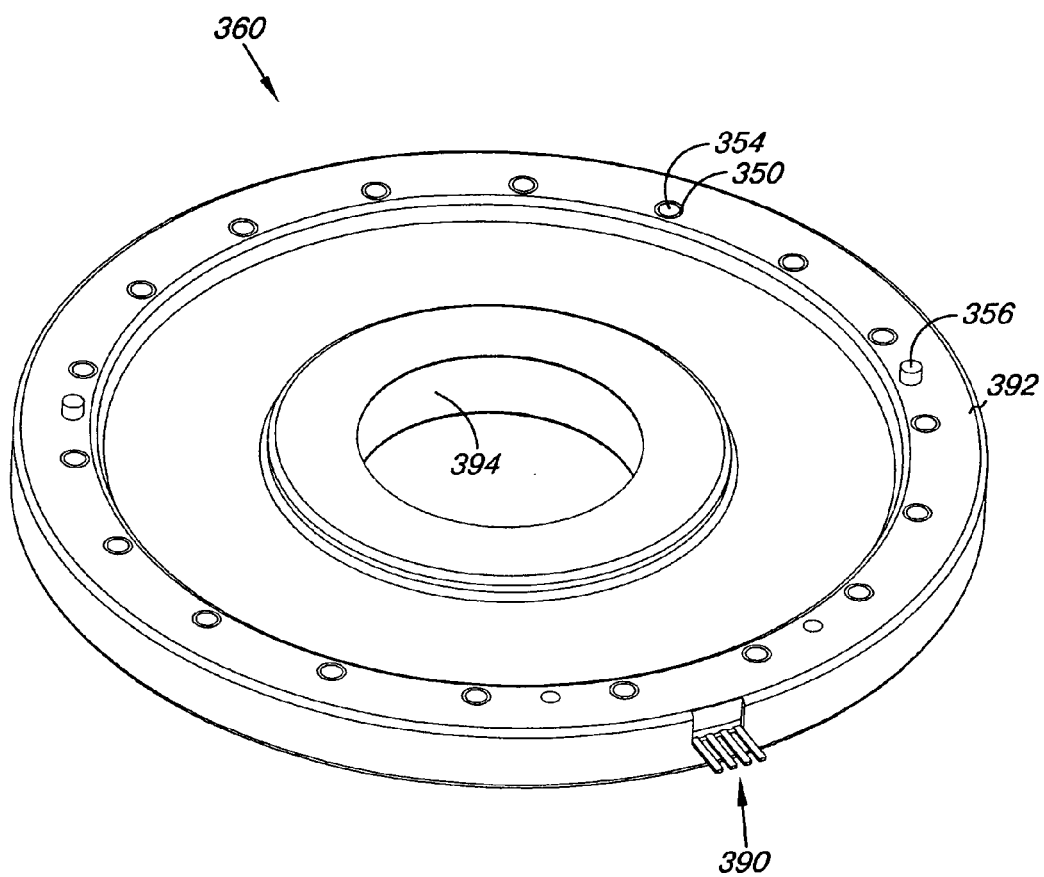
FIG. 3 illustrates one embodiment of an electric motor stator with a housing according to the present disclosure.

FIG. 3 illustrates an embodiment of a stator 360 for an electric motor as described herein. As illustrated, the stator 360 includes a housing 392 that encapsulates the hub, the rim, the post 350 and windings of conductive wire that form the coils. The housing 392 also defines an annular surface 394 adjacent the rotor interface of the hub. In one embodiment, the connector terminals 390 of the stator 360, as discussed herein, extend from the housing 392.

In one embodiment, the bore 354 of the post 350 can receive a mounting shaft to locate and secure the stator 360 in a motor enclosure. The housing 392 can also include an alignment pin 356 that can be used to further locate the stator 360 in the motor enclosure.

In one embodiment, the housing 392 is formed of a thermoset material. As discussed herein, the thermoset material of the housing 392 can be provided through an over molding process. As used herein, a thermoset material includes those polymeric materials that once shaped by heat and pressure so as to form a cross-linked polymeric matrix are incapable of being reprocessed by further application of heat and pressure. As provided herein, thermoset materials can be formed from the polymerization and cross-linking of a thermoset precursor. Such thermoset precursors can include one or more liquid resin thermoset precursors. In one embodiment, liquid resin thermoset precursors include those resins in an A-stage of cure. Characteristics of resins in an A-stage of cure include those having a viscosity of 1,000 to 500,000 centipoises measured at 77° F. (Handbook of Plastics and Elastomers, Editor Charles A. Harper, 1975).

In the embodiments described herein, the liquid resin thermoset precursor can be selected from an unsaturated polyester, a polyurethane, an epoxy, an epoxy vinyl ester, a phenolic, a silicone, an alkyd, an allylic, a vinyl ester, a furan, a polyimide, a cyanate ester, a bismaleimide, a polybutadiene, and a polyetheramide. As will be appreciated, the thermoset precursor can be formed into the thermoset material by a polymerization reaction initiated by heat, pressure, catalysts, and/or ultraviolet light.

As will be appreciated, the thermoset material used in the embodiments of the present disclosure can include non-electrically conducting reinforcement materials and/or additives such as non-electrically conductive fillers, fibers, curing agents, inhibitors, catalysts, and toughening agents (e.g., elastomers), among others, to achieve a desirable combination of physical, mechanical, and/or thermal properties.

Non-electrically conductive reinforcement materials can include woven and/or nonwoven fibrous materials, particulate materials, and high strength dielectric materials. Examples of non-electrically conductive reinforcement materials can include, but are not limited to, glass fibers, including glass fiber variants, synthetic fibers, natural fibers, and ceramic fibers.

Non-electrically conductive fillers include materials added to the matrix of the thermoset material to alter its physical, mechanical, thermal, or electrical properties. Such fillers can include, but are not limited to, non-electrically conductive organic and inorganic materials, clays, silicates, mica, talcs, asbestos, rubbers, fines, and paper, among others.

In an additional embodiment, the liquid resin thermoset precursor can include a polymerizable material sold under the trade designator "Luxolene" from the Kurz-Kasch Company of Dayton Ohio.

Figure 4:
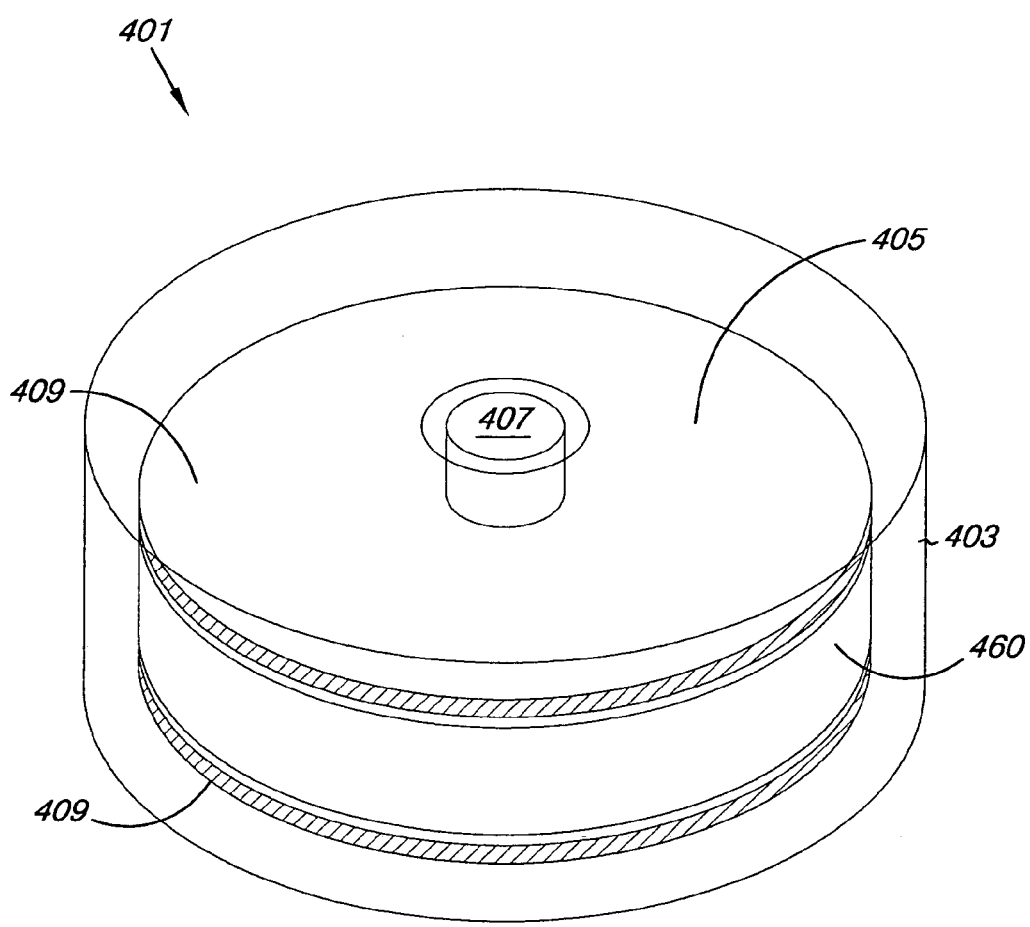
FIG. 4 illustrates one embodiment of an electric motor according to the present disclosure.

FIG. 4 illustrates an embodiment of an electric motor 401 according to an embodiment of the present disclosure. As illustrated, the electric motor 401 includes a motor enclosure 403, the stator 460, as discussed herein, and a rotor 405. For ease of illustration, other components of the electrical motor 401 are not illustrated in FIG. 4, but those skilled in the art will understand the components location and function in the design of an electric motor.

In one embodiment, the motor enclosure 403 of the electric motor 401 has an interior space sufficient to receive and house the stator 460 and the rotor 405. The stator 460 can be fixedly arranged within the interior space of the motor enclosure 403, with the rotor 405 positioned adjacent the stator 460 and rotatably coupled within the interior space of the motor enclosure 403. As illustrated, the rotor 405 has a shaft 407 that extends past the annular surface of the stator 460. The shaft 407 also supports rotor discs 409 that are located at either side of the stator 460. Each disc is made of a magnetically permeable material and has either an inner face of electrically conductive material or an inner face with conductive paths which can function as rotor windings.

In one embodiment, the shaft 407 can be formed from a non-magnetically permeable material. In this way the flux linkage paths from one of the rotor discs to the other of the rotor discs can be reduced and the magnetic paths are contained within the discs and the stator poles. Fringing and losses may be reduced by such a choice of shaft material. In one embodiment the shaft is made from an austenitic stainless steel although other non-magnetically permeable materials may also be used.

Methods and processes for forming the stator and various components of the stator described herein are provided as non-limiting examples of the present disclosure. As will be appreciated, a variety of molding processes exist that can be used to form the over molding component of the stator. Examples of such molding processes can include resin transfer molding, compression molding, transfer molding, and injection molding, among others.

Figure 5:
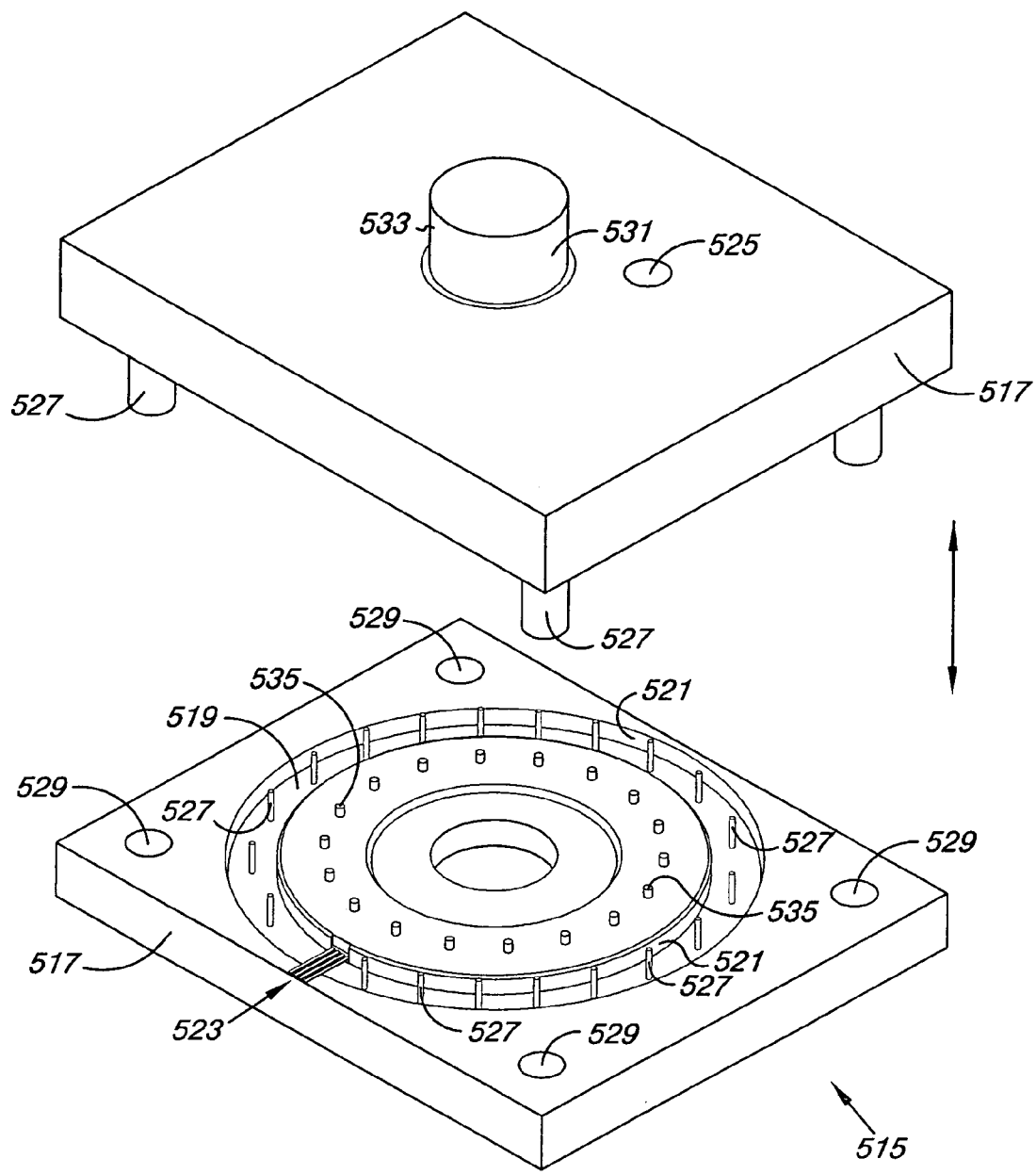
FIG. 5 illustrates one embodiment of a molding tool for over molding a stator according to the present disclosure.

FIG. 5 illustrates embodiments of a molding tool that can be used in a molding process to form embodiments of the stator of the present disclosure. The process for molding the stator can include supplying a thermoset material to the molding tool such that when the thermoset material is cured, it encapsulates the stator.

The following description provides an example of a process for forming an over molded stator according to the teachings described herein. In the following description, some structural features are described, but not shown in the embodiments of FIG. 5. Thus, where structural features are described, but not shown, the description will refer to the embodiment illustrated in FIGS. 1 and 2.

As will be appreciated, the stator can be placed within a molding tool and the thermoset material can be supplied to the molding tool to encapsulate the stator. In one embodiment, the thermoset material can be supplied to the molding tool to completely encapsulate the stator, where the stator can be positioned within the stator housing prior to being encapsulated with the thermoset material.

FIG. 5 illustrates one example of a molding tool 515 for encapsulating the stator according to an embodiment of the present disclosure. In one embodiment, the molding tool 515 includes two mold halves 517. Each mold half includes walls having surfaces that defines a mold cavity volume 519 to receive the stator prior to over molding. For example, the mold cavity 519 can include circumferential walls 521 that are radially positioned to define the volume to receive the stator, as illustrated in FIG. 2.

In one embodiment, the walls of the mold halves further include channel extensions 523 that extend along a surface of the mold halves 517 to receive the connector terminals of the stator, as discussed above with respect to FIGS. 2 and 3.

The channel extensions 523 are sealably designed to receive the connector terminals, which pass through to the exterior of the molding tool 515. The channel extensions 523 form a fluid and pressure tight seal to prevent the thermoset material from discharging from the molding tool 515 through the channel extensions 523 during the molding process.

The molding tool 515 also includes a mold port 525 extending through at least one of the mold halves 517. The molding port 525 provides the proper connections for supplying the thermoset material to the interior of the molding tool 515 in the molding process. The molding tool 515 also includes registration pins 527 that help to position both the stator within the molding tool 515 and align the mold halves 517. As will be appreciated, the molding tool has registration sockets 529 that align with and receive the registration pins 527 when the mold halves 517 close. In one embodiment, the registration pins 527 within the mold cavity volume 519 can be received by one or more of the bores of the stator frame posts.

As will be appreciated, the molding tool 515 can be also be designed to include registers for a central pillar 531. The central pillar 531 includes a cylindrical shape having outer surfaces 533 that help to define the annular surface of the stator when the thermoset material is supplied to the molding tool 515. After the central pillar 531 has been registered within the molding tool 515, the molding tool 515 is closed to form a fluid and pressure tight seal and a thermoset material can then be provided.

In one embodiment, the posts of the stator can also help to position the frame and coils of the stator relative the walls defining the mold cavity volume 519. For example, the posts can be configured to extend beyond the first and second planar surfaces by a predetermined distance. Similarly, the surfaces defining the mold cavity can be configured to abut and apply compressive pressure to the posts once the mold halves 517 are closed. In one embodiment, the registration pins 527 and the surfaces of the mold cavity volume 519 prevent the over molding material from filling the bores of the posts. The pressure also helps to stabilize the stator inside the mold cavity volume 519. Once the mold halves 517 have closed on the stator, the posts position the coils and other structures of the stator at predetermined distances from the surfaces defining the mold cavity volume 519. These predetermined distances in turn define the thicknesses of the housing that encapsulates the stator.

In an additional embodiment, the surfaces defining the mold cavity volume 519 also include stabilizing pins 535 on both the mold halves 517. As illustrated, the stabilizing pins 535 extend from the surface defining the mold cavity volume 519 in a region that is adjacent the third planar surface of the coils. In one embodiment, the stabilizing pins 535 can abut and hold the windings of the coil under pressure to ensure that the coils do not move during the molding process.

Providing the thermoset material can include injecting a thermoset precursor (e.g., low-viscosity thermoset precursor) and catalyst (optional) into the molding under low pressure to fill the mold cavity volume 519 such that the thermoset material encapsulates the stator, except the connector terminals, which extend therefrom. Since the thermoset precursor can include a low viscosity, the thermoset precursor can substantially fill spaces defined by various surfaces of the stator, such as spaces between and around insulated conductive wires, spaces within slots and grooves, and spaces between the inner surface of the circumferential wall and the coils of the stator, among other spaces. Heat and pressure can then be applied to cure the thermoset precursor to form the over molded stator. A post cure process can also be used. After curing, the over molded stator can be removed from the molding tool 515.

Encapsulating (e.g., completely encapsulating) the stator within a thermoset material can provide for improved heat transfer characteristics there from. For example, the thermoset material encasing the insulated conductive wires serves to efficiently conduct heat away from the wires and also to fill the gaps between the wires where they extend from the ends of the stator sections. In addition, the various portions of the stator can be tightly secured together by complete encapsulation. For example, the capsule serves to secure the insulated conductive wires to the stator section to prevent movement of the wire. The thermoset material also serves to secure the stator sections to each other to help prevent the movement of the stator sections with respect to each other. Such a feature can reduce the cost of the stator because the stator does not require a stator ring, a common portion of a stator in the prior art used to secure the annular sections to each other.

Figure 6:
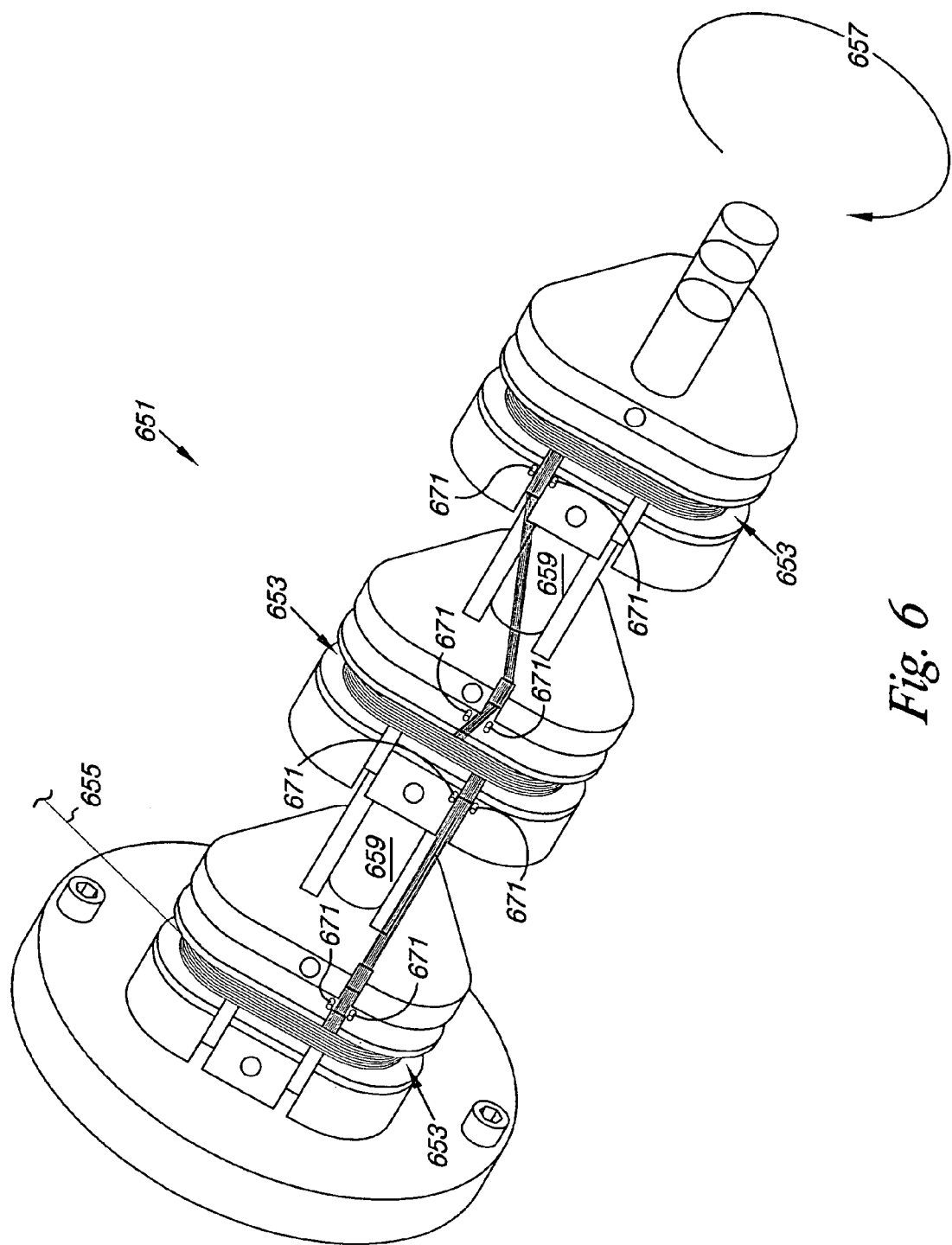
FIG. 6 illustrates one embodiment of a winding mandrel according to the present disclosure.

FIG. 6 illustrates an embodiment of a winding mandrel 651 according to an embodiment of the present disclosure. In one embodiment, the winding mandrel 651 allows for multiple coils to be wound from contiguous lengths of wire. In one embodiment, winding coils from a contiguous length of wire allows multiple coils to be connected in series without the need for start or finish lead segments of the coils to be electrically connected. As will be appreciated, two or more coils in series can be formed using the winding mandrel 651.

As illustrated, the winding mandrel 651 includes a winding channel 653. In one embodiment, the winding channel 653 can receive wire 655 for the windings of the coil. Wire 655 can be feed into the winding channel 653 as the winding mandrel 651 is rotated 657. As a coil is completed, the wire 655 can be extended to the adjacent winding channel 653. The next coil in the series of coils can then be wound.

In one embodiment, the winding mandrel 651 includes spacers 659 that determine a length of wire that extends between the adjacent coils. The spacers 659 can be selected to provide a predetermined length of wire between adjacent coils in the series. As will be appreciated, the predetermined length of wire can be a function of the configuration of coils around the stator frame.

The winding mandrel 651 can also include a pivot post 671 adjacent the winding channel 653. In one embodiment, the pivot post 671 provides a location around which the wire 655 upon completing a coil can be turned and extended to the adjacent winding channel 653. In addition, the pivot post 671 can also provide a location to secure the wire 655 adjacent the winding channel 653 prior to beginning the winding process for the coil. The pivot post 671 can also provide a guide so as to position the location of the connecting segments of the wire 655 between the coils.

In one embodiment, the winding mandrel 651 can provide winding channels 653 to produce up to six (6) coils in series. As will be appreciated, more than six coils could be wound in series if desired. In addition, the wires of the coils can also be bonded in situ on the winding mandrel 651.

Figure 7:
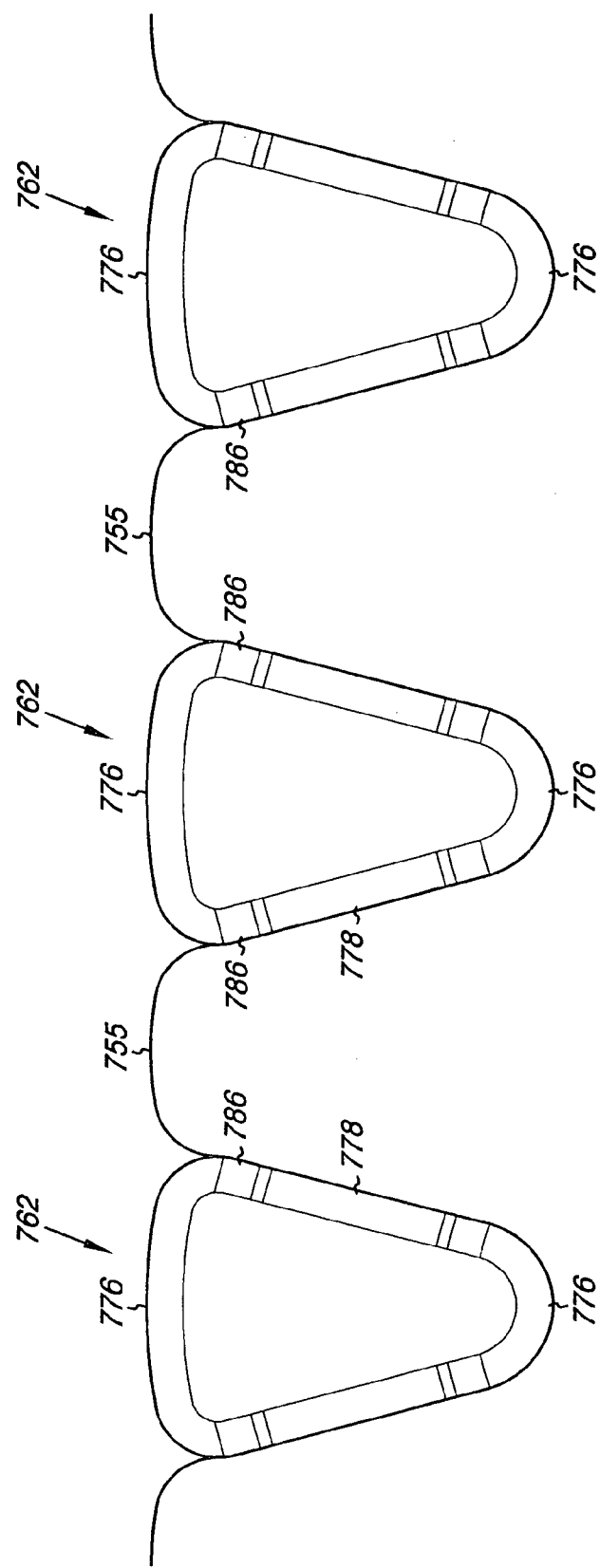
FIG. 7 illustrates one embodiment of coils wound in series according to the present disclosure.

FIG. 7 provides an illustration of the coils 762 coupled in series according to the methods discussed herein. The coils 762 can then be bent so as to form the first and second portions 776, 778 of the coil, as discussed herein. In one embodiment, the first and second portions 776, 778 can be formed by imparting bends 786 into the coils 762.

In one embodiment, the bends 786 can be formed through the use of a machine press operation. For example, the coils 762 can be initially formed without the bends 786. In other words, the coils 762 are wound so as to have a common planar configuration. The coils 762 can then be placed in plates having reliefs that define the location and configuration of the bends to be imparted to the coils 762. The plates are provided in the machine press. The coils 762 are then positioned within the plates. The machine press is then used to press the plates together, thereby deforming the coils 762 so as to form the bends 786. As will be appreciated, other processes for imparting the bends 786 are also possible, including imparting the bends during the winding process itself.

While the present disclosure has been shown and described in detail above, it will be clear to the person skilled in the art that changes and modifications may be made without departing from the spirit and scope of the disclosure. As such, that which is set forth in the foregoing description and accompanying drawings is offered by way of illustration only and not as a limitation. The actual scope of the disclosure is intended to be defined by the following claims, along with the full range of equivalents to which such claims are entitled.

Figure 8:
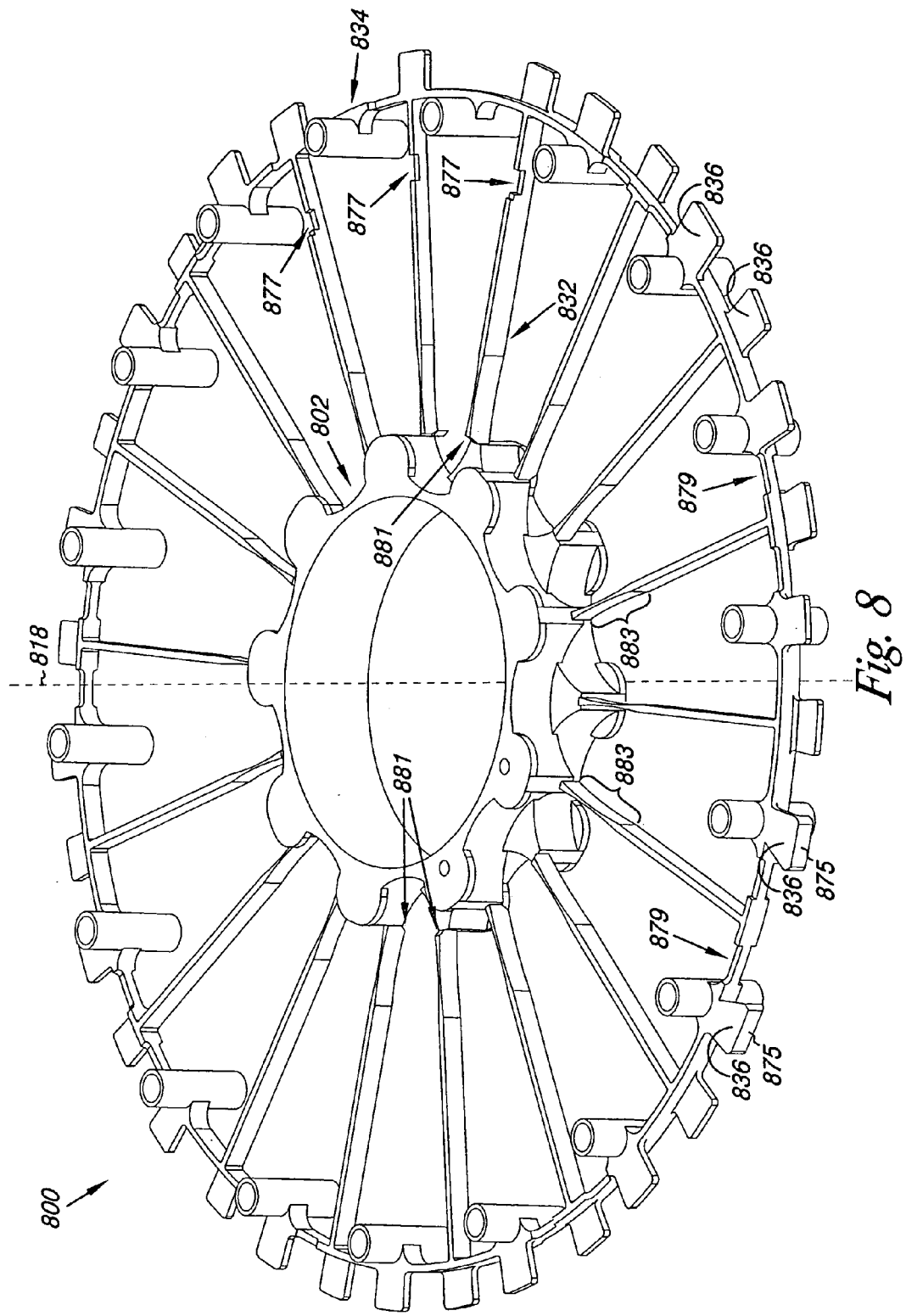
FIG. 8 illustrates one embodiment of a frame for an electric motor stator according to the present disclosure.
Figure 1:
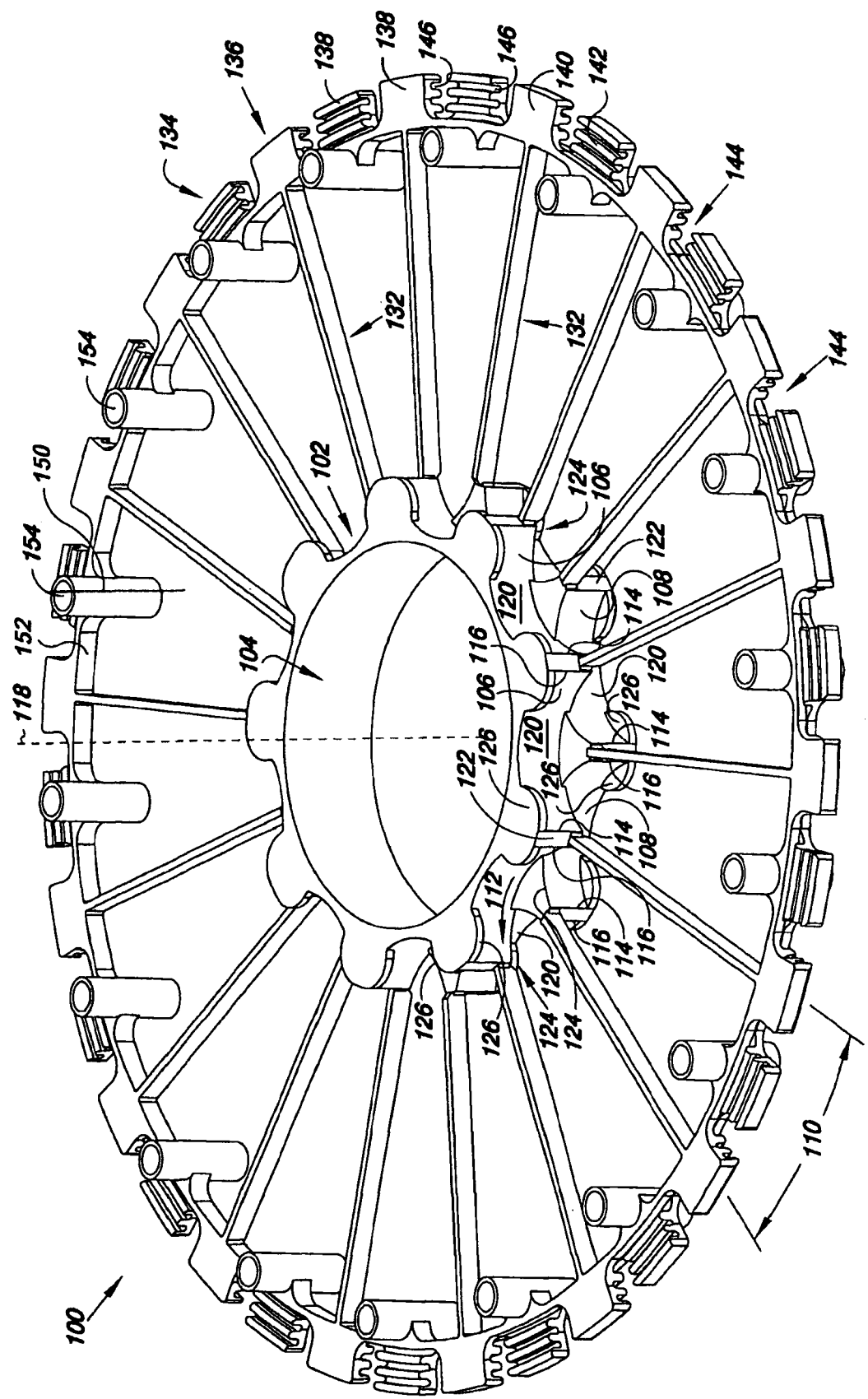
Figure 2:
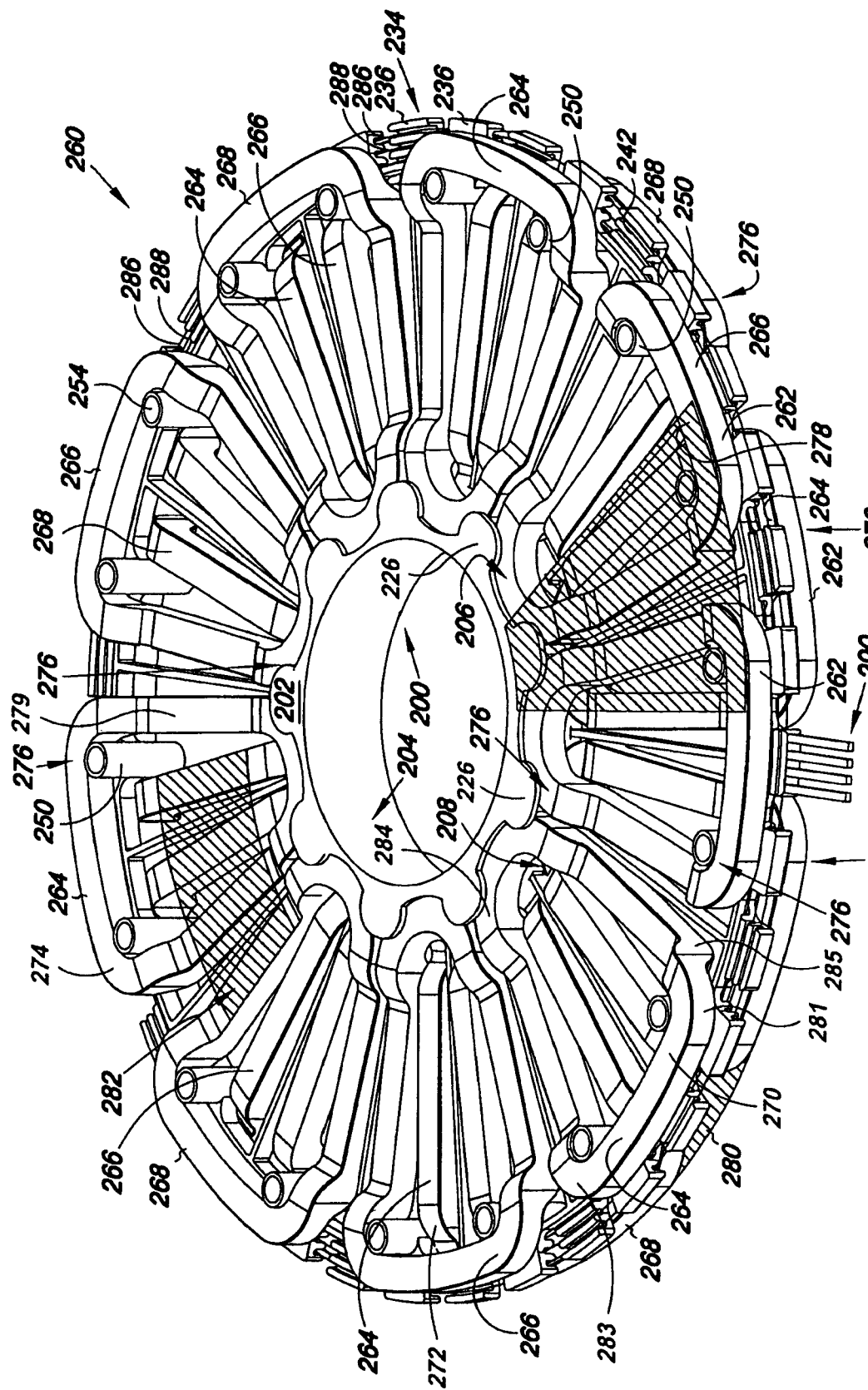

For example, FIG. 8 illustrates an embodiment of a frame 800 for stator windings according to an embodiment of the present disclosure. As illustrated, the frame includes the hub 802, spacing members 832, and the rim 834, as discussed herein. As illustrated, the support ledge 836 of the rim 834 can include projections 875 defined by a wall that extends from the support ledge 836. The projections 875 can help to receive and help maintain the relative position of windings of the coils provided in the frame 800.

In one embodiment, the wall of the projections 875 can extend parallel relative the central axis 818 either above or below the support ledge 836. The direction of the projections 875 can depend upon the side of the support ledge 836 that is to receive the coil. As will be appreciated, one or more of the support ledges 836 can have projections 875. FIG. 8 also illustrates an embodiment in which the spacing members 832 and the rim 834 can also include channels 877, notches 879, and/or ridges 881 for receiving various components (e.g., the coil) of the stator. In addition, FIG. 8 provides an illustration in which the spacing members 832 include a tapered segment 883 relative the remaining segment of the spacing members 832.

In addition, one of ordinary skill in the art will appreciate upon reading and understanding this disclosure that other variations for the disclosure described herein can be included within the scope of the present disclosure.

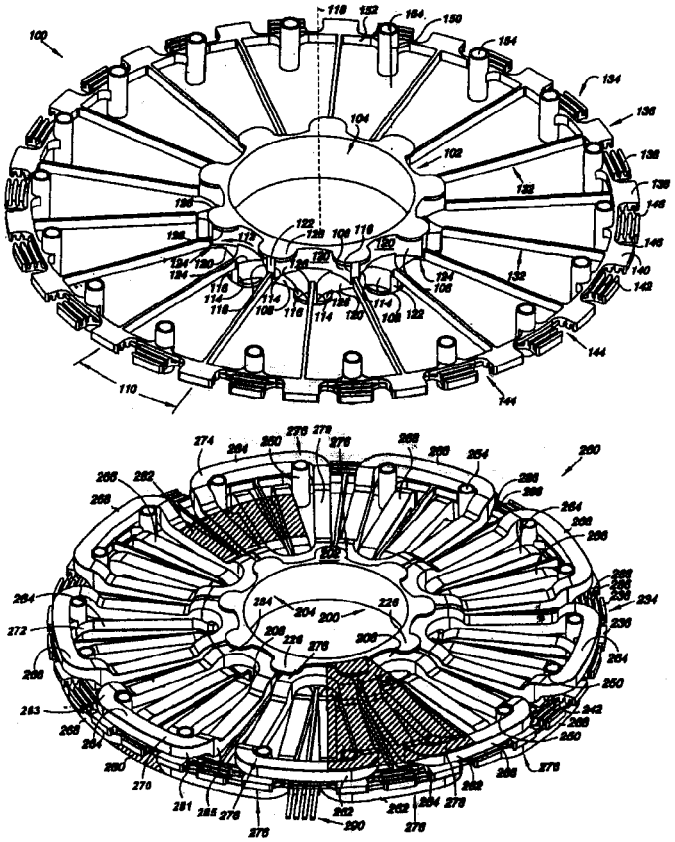

What is claimed is:

1. A frame for stator windings, comprising:
   a hub including a rotor interface, a first winding guide and a second winding guide, the first and second winding guides opposite the rotor interface and radially staggered relative each other by a predetermined angle;
   spacing members coupled to and extending radially from the hub;
   a rim coupled to the spacing members and annularly positioned relative the hub; and
   posts positioned on the rim, where the posts, the first winding guide and the second winding guide receive stator windings of a conductive wire.

2. The frame of claim 1, where the first winding guide and the second winding guide include walls that define a curved surface having a first end and a second end.

3. The frame of claim 2, where the predetermined angle positions the first and second end of adjacent first winding guides between the first and second end of the second winding guide.

4. The frame of claim 3, including a ledge that extends from both the first winding guide to the first and second end of adjacent second winding guides, and the second winding guide to the first and second end of adjacent first winding guides.

5. The frame of claim 2, where the spacing members extend radially from a position adjacent the first end and the second end of adjacent first winding guides and adjacent second winding guides.

6. The frame of claim 2, where the curved surface is concave having a bottom relative the first end and the second end, where the first end and second end of the first and second winding guides are further away from a center axis of the hub than the bottom of the curved surface.

7. The frame of claim 1, where the rim includes a support ledge having two or more sections each with surfaces defining wire guide channels that encircle the hub.

8. The frame of claim 1, where the posts extend perpendicularly from the rim.

9. A stator, comprising:
   a hub including a rotor interface, a first winding guide and a second winding guide, the first and second winding guides opposite the rotor interface and radially staggered relative each other by a predetermined angle;
   a rim annularly positioned relative the hub;
   posts positioned on the rim; and
   windings of conductive wire around at least a portion of the posts and adjacent the first winding guide and the second winding guide of the hub to form coils of an alternating current motor.

10. The stator of claim 9, where a predetermined portion of each of the posts extends above and below the rim to receive the windings of conductive wire.

11. The stator of claim 10, where the windings of conductive wire extend around adjacent posts above the rim and by the first winding guide, and windings of conductive wire extend around adjacent posts below the rim and by the second winding guide to form coils for the alternating current motor.

12. The stator of claim 11, where a first portion of the coils share one of a first common radial plane and a second common radial plane, and a second portion of the coils share a third common radial plane that is different than the first and second common radial planes.

13. The stator of claim 9, where each of the coils include a start lead segment and a finish lead segment that is at least partially contained within the rim, and that is coupled to connector terminals for operating the stator in one of a single phase configuration and a polyphase configuration.

14. The stator of claim 13, including a housing that encapsulates the hub, the rim, the posts and windings of conductive wire, where the connector terminals extend from the housing.

15. The stator of claim 14, where the housing is a thermoset material formed from a liquid resin thermoset precursor that is selected from an unsaturated polyester, a polyurethane, an epoxy, a phenolic, a silicone, an alkyd, an allylic, a vinyl ester, a furan, a polyimide, a cyanate ester, a bismaleimide, a polybutadiene, and a polyetheramide.

16. The stator of claim 9, including spacing members coupled to and extending radially from the hub to the rim.

17. An electric motor, comprising:
   a motor enclosure having an interior space;

a stator fixedly arranged within the interior space of the motor enclosure, the stator including:
- a hub including a rotor interface, a first winding guide and a second winding guide, the first and second winding guides opposite the rotor interface and radially staggered relative each other by a predetermined angle;
- a rim annularly positioned relative the hub;
- posts positioned on the rim;
- windings of conductive wire around at least a portion of the posts and adjacent the first winding guide and the second winding guide of the hub to form coils of the electric motor; and
- connector terminals coupled to the windings for providing a potential through the coils to operate the electric motor; and a rotor positioned adjacent the stator and rotatably coupled within the interior space of the motor enclosure.

18. The electric motor of claim 17, where the rim includes a support ledge with two or more sections each having surfaces defining wire guide channels that encircle the hub, and where each of the coils includes a start lead segment and a finish lead segment that is at least partially contained within the wire guide channels.

19. The electric motor of claim 18, where the start lead segment and the finish lead segment for each of the coils is coupled to the connector terminals for operating the electric motor in one of a single phase configuration and a polyphase configuration.

20. The electric motor of claim 17, including a housing that encapsulates the hub, the rim, the posts and windings of conductive wire, where the connector terminals extend from the housing.

21. The electric motor of claim 20, where the housing is a thermoset material formed from a liquid resin thermoset precursor that is selected from an unsaturated polyester, a polyurethane, an epoxy, a phenolic, a silicone, an alkyd, an allylic, a vinyl ester, a furan, a polyimide, a cyanate ester, a bismaleimide, a polybutadiene, and a polyetheramide.

* * * * *

UNITED STATES PATENT AND TRADEMARK OFFICE
CERTIFICATE OF CORRECTION

PATENT NO. : 7,345,398 B2  Page 1 of 4
APPLICATION NO. : 11/156430
DATED : March 18, 2008
INVENTOR(S) : Stephen H. Purvines et al.

It is certified that error appears in the above-identified patent and that said Letters Patent is hereby corrected as shown below:

Title page & Drawings,
Remove Fig. 1 and Fig. 2 and replace with Replacement Sheets for Fig. 1 and Fig. 2.

Column 4,
Line 48, delete "138" and insert -- 140 -- therefor.

Column 5,
Line 39, delete "224" and insert -- 124 -- therefor.

Column 5,
Line 52, delete "first coil 272" and insert -- first coil 270 -- therefor.

Column 6,
Line 9, delete "278" and insert -- 279 -- therefor.

Column 6,
Line 17, delete "278" and insert -- 280 -- therefor.

Column 6,
Line 20, delete "280" and insert -- 281 -- therefor.

Column 6,
Line 20, delete "282" and insert -- 283 -- therefor.

Column 6,
Line 24, delete "286" and insert -- 285 -- therefor.

Column 6,
Line 28, delete "286" and insert -- 285 -- therefor.

Signed and Sealed this

Eighth Day of June, 2010

David J. Kappos
*Director of the United States Patent and Trademark Office*

(12) United States Patent
Purvines et al.

(10) Patent No.: US 7,345,398 B2
(45) Date of Patent: Mar. 18, 2008

(54) ELECTRIC MOTOR STATOR

(75) Inventors: Stephen H. Purvines, Mishawaka, IN (US); Gary F. Glass, Wabash, IN (US); Andrei Chugunov, Ligonier, IN (US)

(73) Assignee: Kurz-Kasch, Inc., Dayton, OH (US)

( * ) Notice: Subject to any disclaimer, the term of this patent is extended or adjusted under 35 U.S.C. 154(b) by 370 days.

(21) Appl. No.: 11/156,430

(22) Filed: Jun. 20, 2005

(65) Prior Publication Data

US 2006/0284513 A1 Dec. 21, 2006

(51) Int. Cl.
*H02K 1/22* (2006.01)
*H02K 3/04* (2006.01)

(52) U.S. Cl. .............. 310/254; 310/208; 310/268
(58) Field of Classification Search .............. 310/179, 310/206, 208, 254, 268
See application file for complete search history.

(56) References Cited

U.S. PATENT DOCUMENTS

| 3,524,250 | A | * | 8/1970 | Burr | 29/597 |
| 4,319,152 | A | * | 3/1982 | van Gils | 310/201 |
| 5,334,899 | A | * | 8/1994 | Skybyk | 310/268 |
| 5,397,953 | A | * | 3/1995 | Cho | 310/254 |
| 5,744,896 | A | * | 4/1998 | Kessinger et al. | 310/268 |
| 5,767,600 | A | * | 6/1998 | Whiteley | 310/184 |
| RE38,939 | E | * | 1/2006 | Kessinger et al. | 310/268 |
| 6,998,751 | B2 | * | 2/2006 | Lopatinsky et al. | 310/208 |
| 2007/0040465 | A1 | * | 2/2007 | Al-khayat | 310/179 |
| 2007/0210675 | A1 | * | 9/2007 | Bender | 310/268 |

FOREIGN PATENT DOCUMENTS

| WO | WO 97/44880 | 11/1997 |
| WO | WO 03/049256 | 6/2003 |

* cited by examiner

*Primary Examiner*—Tran Nguyen
(74) *Attorney, Agent, or Firm*—Brooks, Cameron & Huebsch, PLLC

(57) ABSTRACT

Devices and methods are provided for a motor stator. One embodiment for a stator includes a frame for stator windings that includes a hub, spacing members, a rim and posts for receiving and positioning windings of a stator coil. A thermoset material is supplied to the stator to encapsulate the stator.

21 Claims, 8 Drawing Sheets